(12) United States Patent
Oh

(10) Patent No.: US 10,228,592 B2
(45) Date of Patent: *Mar. 12, 2019

(54) DISPLAY APPARATUS AND METHOD OF MANUFACTURING THE SAME

(71) Applicant: Samsung Display Co., Ltd., Yongin-si, Gyeonggi-Do (KR)

(72) Inventor: Myong-Soo Oh, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/854,905

(22) Filed: Dec. 27, 2017

(65) Prior Publication Data

US 2018/0120621 A1 May 3, 2018

Related U.S. Application Data

(63) Continuation of application No. 15/290,055, filed on Oct. 11, 2016, now Pat. No. 9,885,929.

(30) Foreign Application Priority Data

Oct. 19, 2015 (KR) .................. 10-2015-0145559

(51) Int. Cl.
  *H01L 33/00* (2010.01)
  *G02F 1/1345* (2006.01)
(52) U.S. Cl.
  CPC .................. *G02F 1/13452* (2013.01)

(58) Field of Classification Search
  USPC ..... 257/252–254, 13, 79–103, 918, 40, 191, 257/E51.018, E51.022, E33.001–E33.077
  See application file for complete search history.

(56) References Cited

U.S. PATENT DOCUMENTS 9,885,929 B2\* 2/2018 Oh .................. G02F 1/13452
2008/0088768 A1\* 4/2008 Kohno .............. G02F 1/13452
                                                                    349/60

(Continued)

FOREIGN PATENT DOCUMENTS

| JP | 2006196878 A | 7/2006 |
|---|---|---|
| KR | 1020040100756 A | 12/2004 |
| KR | 1020130069076 A | 6/2013 |

*Primary Examiner* — Tram H Nguyen
(74) *Attorney, Agent, or Firm* — Cantor Colburn LLP

(57) ABSTRACT

A display apparatus includes a display panel, a driver, a controller and a first flexible substrate. The display panel includes first and second substrates facing each other. The first substrate includes a switching element connected to a pixel electrode. The driver provides a driving signal to the display panel. The controller provides a control signal to the driver. The controller includes first and second printed circuit boards spaced apart from each other. The first flexible substrate electrically connects the first and second printed circuit boards to each other. The first flexible substrate defines a first contact portion at which the first flexible substrate is connected to the first printed circuit board, a second contact portion at which the first flexible substrate is connected to the second printed circuit board, and an overlap portion overlapping the display panel and at which the first flexible substrate is attached to the display panel.

14 Claims, 12 Drawing Sheets

(56) References Cited

U.S. PATENT DOCUMENTS

| | | | |
|---|---|---|---|
| 2011/0187692 A1* | 8/2011 | Jung | G06F 3/038 345/211 |
| 2012/0194773 A1* | 8/2012 | Kim | G02F 1/13336 349/139 |
| 2014/0092028 A1* | 4/2014 | Prest | G06F 1/1643 345/173 |

* cited by examiner

DISPLAY APPARATUS AND METHOD OF MANUFACTURING THE SAME

This application is a continuation application of U.S. application Ser. No. 15/290,055 filed Oct. 11, 2016 which claims priority to Korean Patent Application No. 10-2015-0145559, filed on Oct. 19, 2015, and all the benefits accruing therefrom under 35 U.S.C. § 119, the content of which in its entirety is herein incorporated by reference.

BACKGROUND

1. Field

Exemplary embodiments of the invention relate to a display apparatus. More particularly, exemplary embodiments of the invention relate to a display apparatus including a driver which outputs a driving signal and a method of manufacturing the display apparatus.

2. Description of the Related Art

A display apparatus includes a display panel, a driver and a controller. The display panel includes an active area and a peripheral area which is disposed adjacent to the active area. In addition, the driver includes a gate driver and a data driver. The driver applies a driving signal to the display panel. The controller includes a plurality of printed circuit boards which are spaced apart from each other. The controller applies a control signal to the driver.

The display apparatus includes a flexible substrate electrically connecting the printed circuit boards to the display panel and a flexible flat cable ("FFC") or a flexible printed circuit ("FPC") electrically connecting the printed circuit boards.

SUMMARY

One or more exemplary embodiment of the invention provides a display apparatus manufactured by a simplified method.

One or more exemplary embodiment of the invention also provides a method of manufacturing the display apparatus capable of simplifying manufacturing of the display apparatus.

In an exemplary embodiment of a display apparatus according to the invention, the display apparatus includes a display panel which displays an image, a driver connected to the display panel, a controller connected to the driver and a first flexible substrate. The display panel includes a first substrate and a second substrate facing the first substrate. The first substrate includes a switching element and a pixel electrode which is electrically connected to the switching element. The driver is configured to provide a driving signal to the display panel. The controller is configured to provide a control signal to the driver. The controller includes a first printed circuit board and a second printed circuit board which are spaced apart from each other. The first flexible substrate electrically connects the first printed circuit board to the second printed circuit board. The first flexible substrate defines a first contact portion thereof at which the first flexible substrate is connected to the first printed circuit board, a second contact portion thereof at which the first flexible substrate is connected to the second printed circuit board and an overlap portion thereof overlapping a portion of the display panel and at which the first flexible substrate is attached to the display panel.

In an exemplary embodiment, the first and second printed circuit boards may be spaced apart from each other in a first direction. The first flexible substrate may further define: a first connecting portion thereof extending in a second direction crossing the first direction to connect the first contact portion and the overlap portion to each other; a second connecting portion thereof extending in the second direction to connect the second contact portion and the overlap portion to each other; and a third connecting portion extending in the first direction to connect the first connecting portion and the second connecting portion to each other.

In an exemplary embodiment, the first flexible substrate may include a dummy line which is disposed on the first to third connecting portions of the first flexible substrate.

In an exemplary embodiment, the first flexible substrate may include polyimide.

In an exemplary embodiment, the display panel may include an active area which displays the image, and a peripheral area which is disposed adjacent to the active area and which does not display the image. The overlap portion may overlap the peripheral area of the display panel and the first flexible substrate may be attached to the peripheral area of the display panel at the overlap portion.

In an exemplary embodiment, the overlap portion may overlap the first substrate of the display panel and the first flexible substrate may be attached to the first substrate of the display panel at the overlap portion.

In an exemplary embodiment, the overlap portion may overlap the second substrate of the display panel and the first flexible substrate may be attached to the second substrate of the display panel at the overlap portion.

In an exemplary embodiment, the driver may include a data driver. The data driver may include a second flexible substrate provided in plurality respectively electrically connecting the first and second printed circuit boards to the display panel.

In an exemplary embodiment, the data driver may further include a data driving chip provided in plurality respectively mounted on the second flexible substrates by a chip on film ("COF") method.

In an exemplary embodiment, the data driver may further include a data driving chip provided in plurality respectively mounted on the first substrate by a chip on glass ("COG") method.

In an exemplary embodiment, the driver may include a gate driver. The gate driver may include a gate driving chip provided in plurality directly mounted on the first substrate.

In an exemplary embodiment, in the top plan view, the first flexible substrate may have a rectangular shape.

In an exemplary embodiment, in the top plan view, the first flexible substrate may have a U-shape.

In an exemplary embodiment of a method of manufacturing a display apparatus according to the invention, the method includes providing a display panel which displays a image and includes a first substrate and a second substrate which faces the first substrate, attaching a first flexible substrate to the display panel by thermo-compression bonding such that a first portion of the first flexible substrate overlaps a portion of the display panel and attaching a second flexible substrate provided in plurality to the display panel by thermo-compression bonding, providing a first printed circuit board and a second printed circuit board, and attaching the first flexible substrate to the first and second printed circuit boards by thermo-compression bonding such that a second portion of the first flexible substrate different from the first portion respectively overlaps the first and second printed circuit boards and attaching the second flexible substrates to the first and second printed circuit boards by thermo-compression bonding. The first substrate comprising a switching element and a pixel electrode which is electrically connected to the switching element.

In an exemplary embodiment, the first flexible substrate and the second flexible substrates may be simultaneously attached to the display panel in a same thermo-compression bonding operation.

In an exemplary embodiment, the first flexible substrate and the second flexible substrates may be simultaneously attached to the first and second printed circuit boards in a same thermo-compression bonding operation.

In an exemplary embodiment, the display panel may include an active area which displays the image and a peripheral area which is disposed adjacent to the active area and which does not display the image. The first flexible substrate may be attached to the display panel at the peripheral area of the display panel.

In an exemplary embodiment, the first flexible substrate may be attached to the display panel at the first substrate of the display panel.

In an exemplary embodiment, the first flexible substrate may be attached to the display panel at the second substrate of the display panel.

According to one or more exemplary embodiment of the display apparatus and the method of manufacturing the display apparatus, a plurality of second flexible substrates to electrically connect the first and second printed circuit boards to the display panel, and a first flexible substrate to connect the first and second printed circuit boards to each other, are simultaneously attached thereto by the thermo-compression bonding.

Thus, according to one or more exemplary embodiment of the display apparatus and the method of manufacturing the display apparatus, an additional process of connecting a flexible flat cable ("FFC") or a flexible printed circuit ("FPC") to connect the first and second printed circuit boards to each other in a conventional method of manufacturing a display apparatus is obviated such that a method of manufacturing a display apparatus may be simplified. In addition, according to one or more exemplary embodiment of the display apparatus and the method of manufacturing the display apparatus, the manufacturing time and the manufacturing cost of the display apparatus may be reduced.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Figure 1:
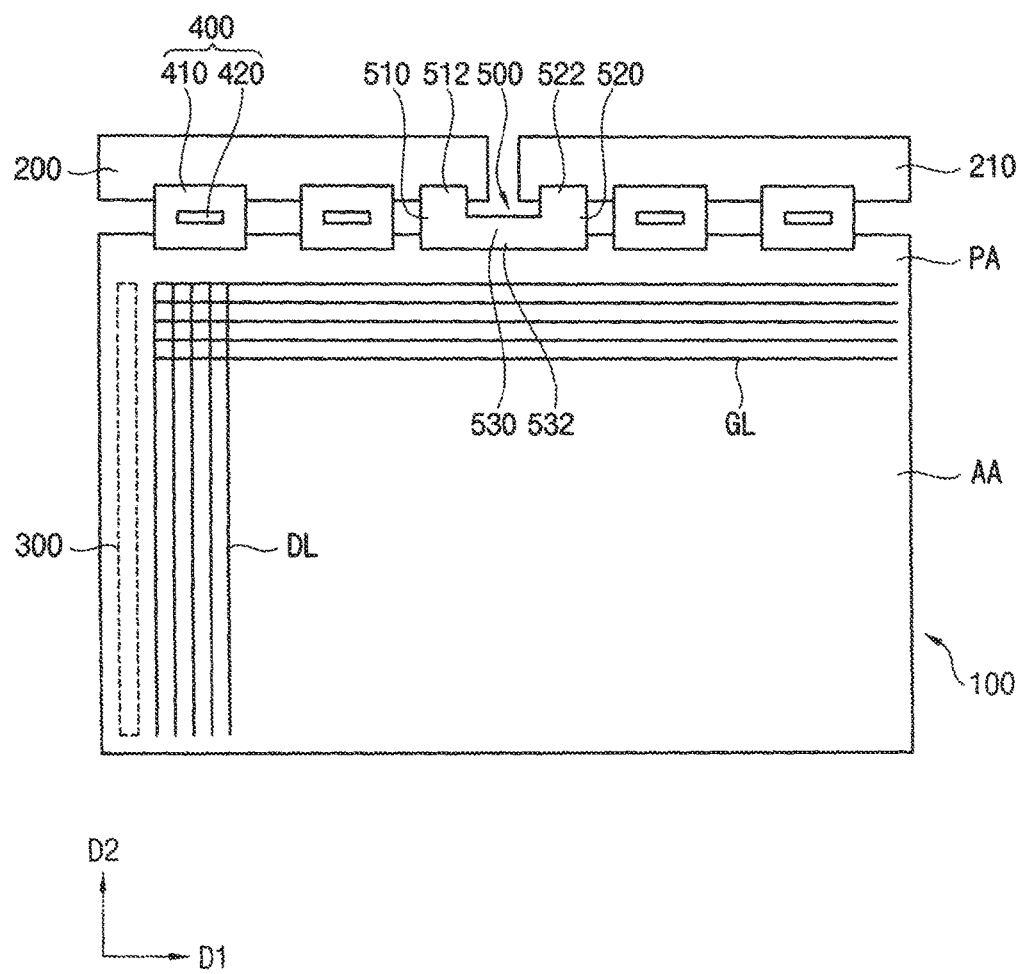
FIG. 1 is a top plan view illustrating an exemplary embodiment of a display apparatus according to the invention.

In manufacturing a conventional display apparatus including a display panel, a driver, a controller including a plurality of printed circuit boards, a flexible substrate electrically connecting the printed circuit boards to the display panel, and a flexible flat cable ("FFC") or a flexible printed circuit ("FPC") electrically connecting the printed circuit boards to each other and/or to the display panel, a thermos-compression bonding to connect the flexible substrate to the display panel and/or to the printed circuit boards is utilized. In addition, in manufacturing the conventional display apparatus, an additional process to connect the FFC or the FPC to the printed circuit boards is employed. Accordingly, the processes of manufacturing the conventional display apparatus may be relatively complex and the manufacturing time and the manufacturing cost of the display apparatus may undesirably increase.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or"

includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, one or more exemplary embodiment of the invention will be explained in detail with reference to the accompanying drawings.

Figure 2:
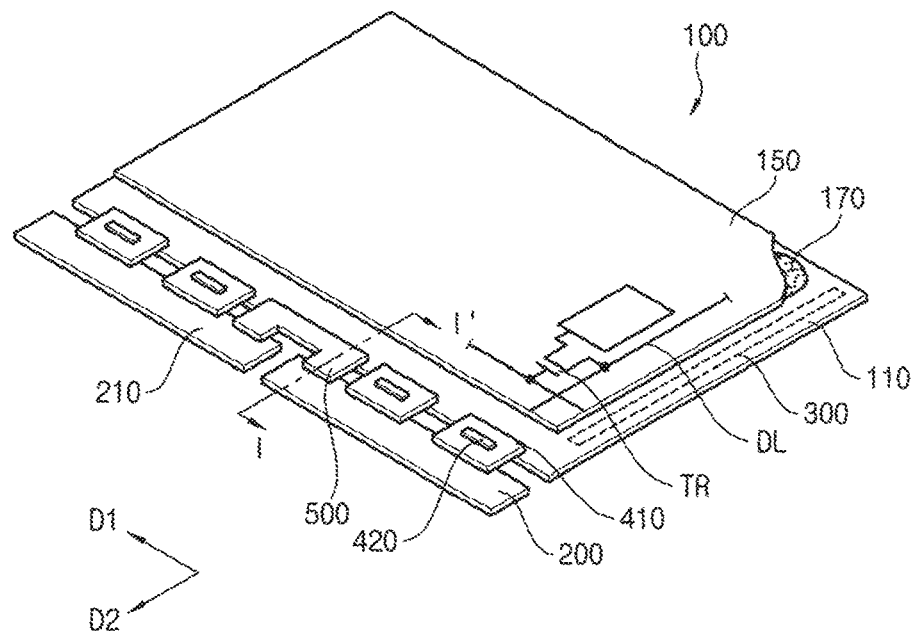
FIG. 2 is a perspective view illustrating the display apparatus of FIG. 1.
Figure 3:
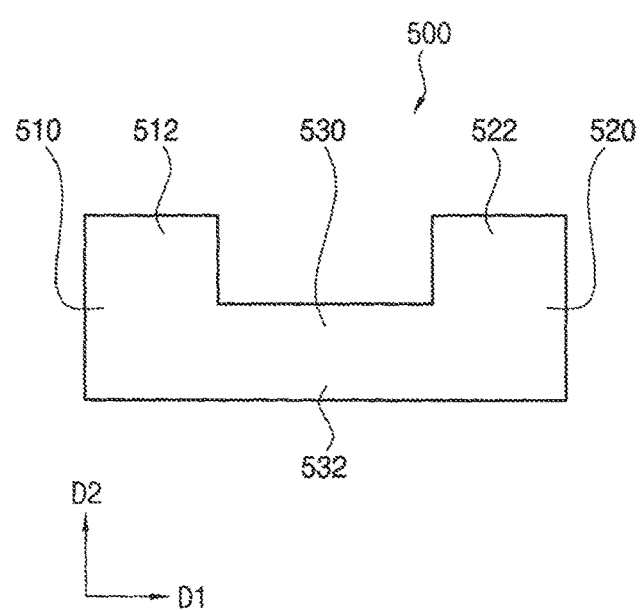
FIG. 3 is a top plan view illustrating an exemplary embodiment of a first flexible substrate of the display apparatus of FIG. 1.
Figure 4:
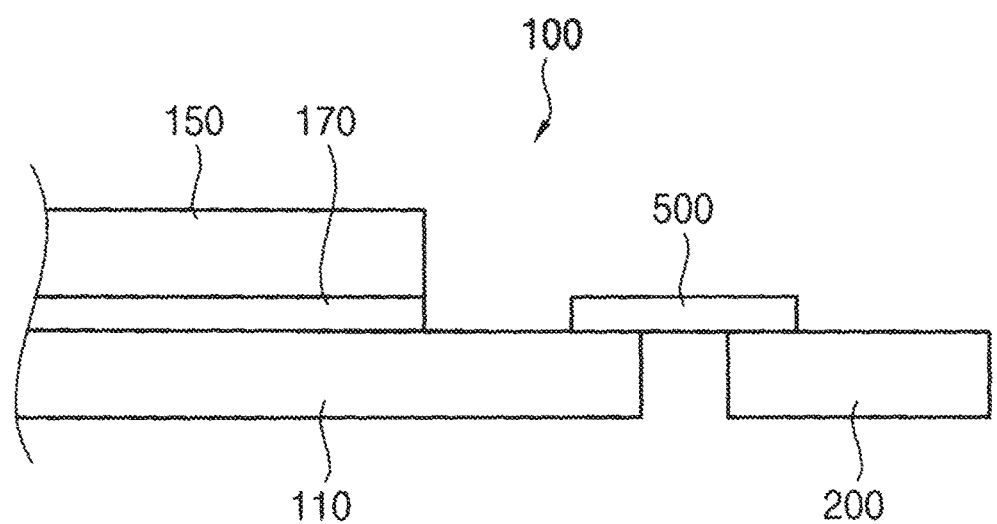
FIG. 4 is a cross-sectional view illustrating the display apparatus along line I-I' of FIG. 2.

FIG. 1 is a top plan view illustrating an exemplary embodiment of a display apparatus according to the invention. FIG. 2 is a perspective view illustrating the display apparatus of FIG. 1. FIG. 3 is a top plan view illustrating an exemplary embodiment of a first flexible substrate of the display apparatus of FIG. 1. FIG. 4 is a cross-sectional view illustrating the display apparatus along line I-I' of FIG. 2.

Referring to FIGS. 1 to 4, the display apparatus includes a display panel 100, a driver, a controller and a first flexible substrate 500.

The display panel 100 includes or defines an active area AA displaying an image and a peripheral area PA which is disposed adjacent to the active area AA and not displaying an image. The active area AA may be a display area of the display panel 100 and/or the display apparatus.

The display panel 100 includes a gate line GL provided in plural lengthwise extending in a first direction D1 and a data line DL provided in plural lengthwise extending in a second direction D2 crossing the first direction D1. Each of the gate line GL and the data line DL define a length thereof which is larger than a width thereof, where the width is taken perpendicular to the length. In the top plan view, for example, the length of the gate line GL extends in the first direction D1, while the width extends in the second direction D2. The display panel 100 includes a pixel provided in plural and electrically connected to a gate line GL among the gate lines GL and a data line DL among the data lines DL. The gate lines GL, the data lines DL and the pixels are disposed in the active area AA. The pixels may otherwise be referred to as display pixels.

Each pixel includes a switching element TR, and a liquid crystal capacitor (not shown) and a storage capacitor (not shown) which are electrically connected to the switching element TR. The pixels may be disposed in a matrix form in the active area AA.

The display panel 100 includes a first (display) substrate 110, and a second (display) substrate 150 which faces the first substrate 110.

In an exemplary embodiment, for example, the first substrate 110 may be an array substrate. The gate lines GL and the data lines DL may be disposed on a base substrate (not shown) of the first substrate 110 and within the first substrate 110. In addition, the switching elements TR respectively connected to the gate lines GL and the data lines DL may be disposed on the first base substrate and within the first substrate 110. In addition, a pixel electrode may be disposed on the first base substrate and within the first substrate 110.

The second substrate 150 may be opposite to the first substrate 110. A common electrode of the second substrate 150 which faces the pixel electrode PE of the first substrate 110 may be disposed on a base substrate (not shown) of the second substrate 150 and within the second substrate 150. In an exemplary embodiment, in a cross-sectional view or thickness direction of the display panel 100, the common electrode may be disposed on a lower surface of the base substrate of the second substrate 150 to face an upper surface of the base substrate of the first substrate 110. In addition, a color filter (not shown) defining a color of the pixel may be disposed on the base substrate of the second substrate 150 and within the second substrate 150, such as under (e.g., on a lower surface of) the base substrate of the second substrate 150.

An overlap area (in the top plan view) between the first substrate 110 and the second substrate 150 may be substantially the same as the active area AA of the display panel 100, such as an entirety of the overlap area between the first substrate 110 and the second substrate 150. That is, the peripheral area PA may include only the non-overlapping area of the first substrate 110 relative to the second substrate 150. Alternatively, the active area AA may be defined by reducing the entirety of the overlap area by an area (in the top plan view) where a sealing element (not shown) is disposed. That is, the peripheral area PA may include the non-overlapping area of the first substrate 110 relative to the second substrate 150 in addition to a portion of both the first and second substrates 110 and 150 taken from outer edges thereof to and/or including an area of the sealing element.

The display panel 100 may further include an optical medium layer 170 which changes orientation of light passing therethrough. In an exemplary embodiment, the display panel 100 may include a liquid crystal layer 170 disposed between the first substrate 110 and the second substrate 150. Alternatively, the display panel 100 may further include an organic light emitting layer as the optical medium layer 170 disposed between the first substrate 110 and the second substrate 150.

The driver collectively includes a gate driver 300 and a data driver 400. The driver may provide a driving signal to the display panel 100 to drive the display panel 100. The controller includes first and second printed circuit boards 200 and 210 which are spaced apart from each other. The controller may provide a control signal to the driver to control the driver.

A timing controller (not shown) and a power voltage generator (not shown) may be disposed on the first and/or second printed circuit boards 200 and 210.

In an exemplary embodiment, the timing controller receives input image data and an input control signal from an external apparatus (not shown) which is external to the timing controller. In an exemplary embodiment, the input image data may include red image data, green image data and blue image data. In an exemplary embodiment, the input control signal may include a master clock signal and a data enable signal. In an exemplary embodiment, the input control signal may further include a vertical synchronization signal and a horizontal synchronization signal.

In an exemplary embodiment, the timing controller generates a first control signal, a second control signal and a data signal based on the input image data and the input control signal.

In an exemplary embodiment, the timing controller generates the first control signal for controlling an operation of the gate driver 300 based on the input control signal and outputs the first control signal to the gate driver 300.

In an exemplary embodiment, the timing controller generates the second control signal for controlling an operation of the data driver 400 based on the input control signal and outputs the second control signal to the data driver 400.

In an exemplary embodiment, the timing controller generates the data signal based on the input image data and outputs the data signal to the data driver 400.

In an exemplary embodiment, the gate driver 300 generates gate signals to drive the gate lines GL in response to the first control signal received from the timing controller. In an exemplary embodiment, the gate driver 300 sequentially outputs the gate signals to the gate lines GL.

In an exemplary embodiment, the gate driver 300 may include a gate driving chip (not shown) provided in plural integrated on the peripheral area PA of the display panel 100. The gate driver 300 may include the gate driving chips directly mounted (e.g., integrated) on the first substrate 110, but the invention is not limited thereto.

Alternatively, the gate driver 300 may include a flexible substrate provided in plural attached to the peripheral area PA of the display panel 100 and a gate driving chip provided in plural respectively integrated on the flexible substrates.

In an exemplary embodiment, the data driver 400 receives the second control signal and the data signal from the timing controller. In an exemplary embodiment, the data driver 400 converts the data signal to a data voltage having an analog type. In an exemplary embodiment, the data driver 400 outputs the data voltage to the data line DL.

When the display panel 100 includes the liquid crystal layer 170, the display apparatus may further include a backlight assembly (not shown) disposed under the first substrate 110 and generating and providing light to the display panel 100.

Alternatively, when the display panel 100 includes the organic light emitting layer which generates and provides light for the display panel 100 (e.g., self-emissive), the display apparatus may not include the backlight assembly.

In an exemplary embodiment, for example, the control signal provided to the driver from the controller may include the first and second control signals and the data signal.

In addition, for example, the driving signal provided to the display panel 100 from the driver may include the gate signal and the data voltage.

The data driver 400 may collectively include a second flexible substrate 410 provided in plural respectively electrically connecting the first and second printed circuit boards 200 and 210 to the display panel 100, and a data driving chip 420 provided in plural respectively on the second flexible substrates 410.

In an exemplary embodiment, for example, the data driving chips 420 may be respectively mounted on the second flexible substrates 410 by a chip on film ("COF") method. Alternatively, the data driving chips 420 may be respectively mounted on the peripheral area PA of the first substrate 110 by a chip on glass ("COG") method.

The first flexible substrate 500 may electrically connect the first printed circuit board 200 to the second printed circuit board 210. The first flexible substrate 500 includes a first contact portion 512, a second contact portion 522 and an overlap portion 532. The first contact portion 512 overlaps a portion of the first printed circuit board 200. The first contact portion 512 electrically connects the first flexible substrate 500 to the first printed circuit board 200. The first flexible substrate 500 is attached to the first printed circuit board 200 at the first contact portion 512. The second contact portion 522 overlaps a portion of the second printed circuit board 210. The second contact portion 522 electrically connects the first flexible substrate 500 to the second printed circuit board 210. The first flexible substrate 500 is attached to the second printed circuit board 210 at the second contact portion 514. The overlap portion 532 overlaps a portion of the display panel 100. The overlap portion 532 attaches the first flexible substrate 500 to the display panel 100. The first flexible substrate 500 is attached to the display panel 100 at the overlap portion 532. The overlap portion 532 common to both the first and second contact portions 512 and 522 via connecting portions supports the first flexible substrate 500.

In an exemplary embodiment, the first flexible substrate 500 may further include a first connecting portion 510, a second connecting portion 520 and a third connecting portion 530. The first connecting portion 510 connects the first contact portion 512 and the overlap portion 532 to each other. The first connecting portion 510 defines a length thereof which extends in the second direction D2. The second connecting portion 520 connects the second contact portion 522 and the overlap portion 532 to each other. The second connecting portion 520 defines a length thereof which extends in the second direction D2. The third connecting portion 530 connects the first connecting portion 510 and the second connecting portion 520 to each other. The third connecting portion 530 defines a length thereof which extends in the first direction D1. The third connecting portion 530 may be defined by an area of the first flexible substrate 500 which does not overlap any of the display panel 100, the first printed circuit board 200 or the second printed circuit board 210.

The first flexible substrate 500 may define the first contact portion 512, the second contact portion 522, the overlap portion 532, the first connecting portion 510, the second connecting portion 520 and the third connecting portion 530. The first flexible substrate 500 may be a single, unitary member. Any one of the first contact portion 512, the second contact portion 522, the overlap portion 532, the first connecting portion 510, the second connecting portion 520 and the third connecting portion 530 may be considered as extended to define another one of the first contact portion 512, the second contact portion 522, the overlap portion 532, the first connecting portion 510, the second connecting portion 520 and the third connecting portion 530.

The first flexible substrate 500 may further include a connecting line (not shown) provided in plural extending along the first contact portion 512, the first connecting portion 510, the third connecting portion 530, the second connecting portion 520 and the second contact portion 522. The connecting lines may not be provided on the overlap portion 532 which overlaps the first substrate 110. The first printed circuit board 200 connected to the first flexible substrate 500 may be electrically connected to the second printed circuit board 210 connected to the first flexible substrate 500, through the connecting lines of the first flexible substrate 500.

In an exemplary embodiment, for example, the second control signal and the data signal outputted from the timing controller may be transmitted between the first and second printed circuit boards 200 and 210 through the connecting lines of the first flexible substrate 500 commonly connected to both the first and second printed circuit boards 200 and 210.

In addition, a power voltage generated by the power voltage generator (not shown) may be transmitted between the first and second printed circuit boards 200 and 210 through the connecting lines of the first flexible substrate 500 commonly connected to both the first and second printed circuit boards 200 and 210.

In an exemplary embodiment, the first flexible substrate 500 may include a material such as polyimide. The first flexible substrate 500 may have a U-shape in the top plan view.

The overlap portion 532 of the first flexible substrate 500 may overlap the first substrate 110 and may be attached to the first substrate 110. The overlap portion 532 of the first flexible substrate 500 may overlap the peripheral area PA of the display panel 100 and may be attached to the peripheral area PA. The overlap portion 532 of the first flexible substrate 500 may overlap only the first substrate 110, but the invention is not limited thereto.

In an exemplary embodiment, the first flexible substrate 500 and the second flexible substrates 410 may include substantially the same material. In an exemplary embodiment of a method of manufacturing a display apparatus, the first flexible substrate 500 and the second flexible substrates 410 may be respectively attached to the display panel 100 and the first and second printed circuit boards 200 and 210 in a same operation or process.

In one or more exemplary embodiment of the invention, since the first flexible substrate 500 and the second flexible substrates 410 may each be respectively attached to the display panel 100 and the first and second printed circuit boards 200 and 210 in a same operation or process, the method of manufacturing the display apparatus may be simplified and the manufacturing cost of the display apparatus may be reduced.

In addition, the overlap portion 532 of the first flexible substrate 500 may be defined by an entire length (in the first direction D1) of the first flexible substrate 500, and such length may be larger than a width of the flexible substrate 500 (in the second direction D2). The overlap portion 532 of the first flexible substrate 500 as a relatively large dimension of the first flexible substrate 500, is attached to the first substrate 110 so that the first flexible substrate 500 may be supported relative to the display panel 100 by the overlap portion 532. Thus, by common connection to the first flexible substrate 500, reliability of the connection between the first and second printed circuit boards 200 and 210 may be improved.

Figure 5:
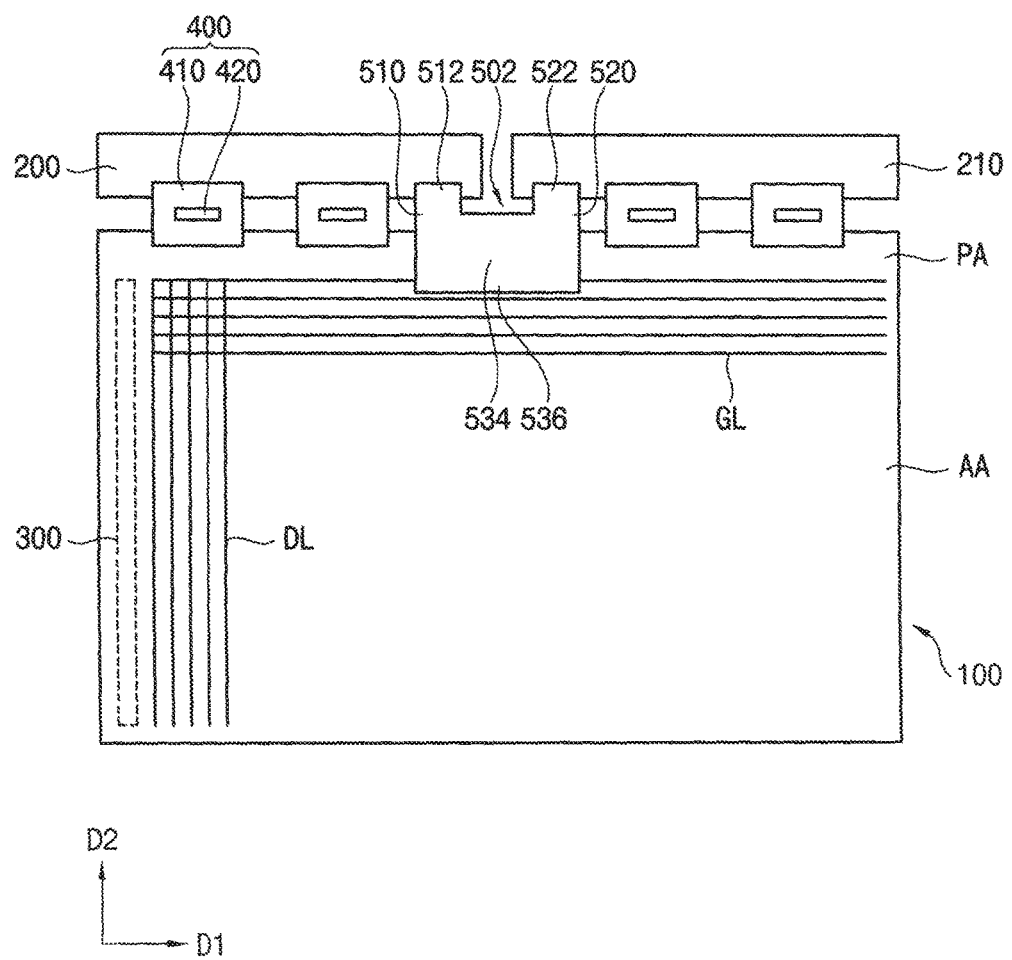
FIG. 5 is a top plan view illustrating another exemplary embodiment of a display apparatus according to the invention.
Figure 6:
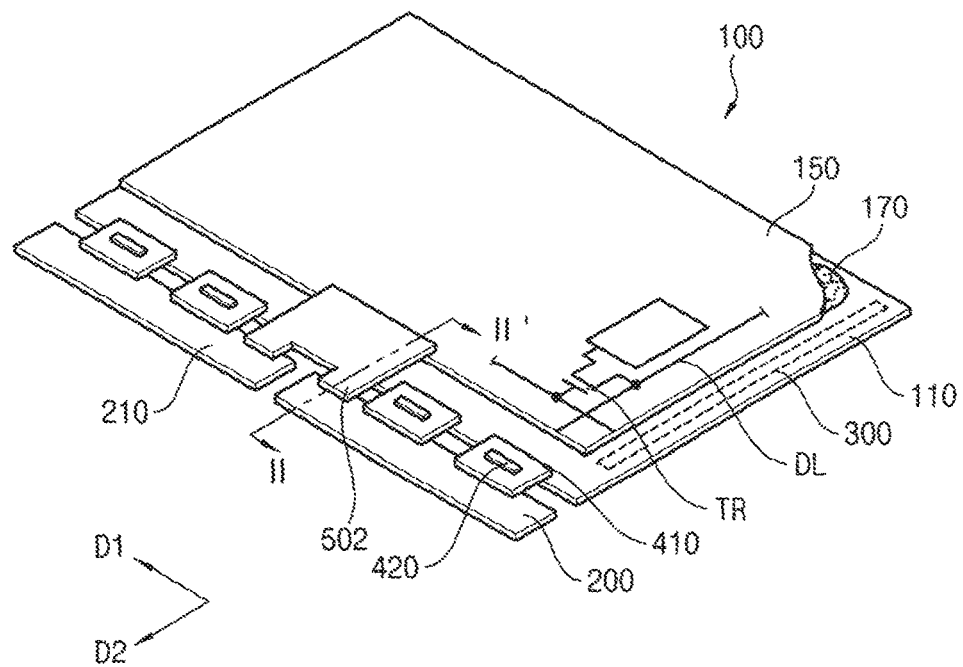
FIG. 6 is a perspective view illustrating the display apparatus of FIG. 5.
Figure 7:
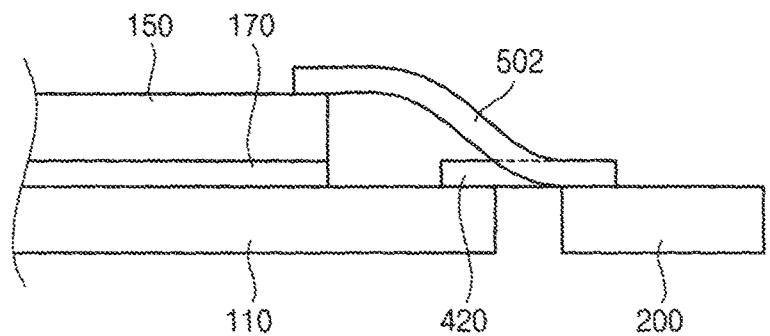
FIG. 7 is a cross-sectional view illustrating the display apparatus along line II-II' of FIG. 6.

FIG. 5 is a top plan view illustrating another exemplary embodiment of a display apparatus according to the invention. FIG. 6 is a perspective view illustrating the display apparatus of FIG. 5. FIG. 7 is a cross-sectional view illustrating the display apparatus along line II-II' of FIG. 6. The display apparatus of FIGS. 5-7 is substantially the same as the display apparatus of the previous exemplary embodiment explained referring to FIGS. 1 to 4 except that the overlap portion overlaps the second substrate. Thus, the same reference numerals will be used to refer to the same or like parts as those described in the previous exemplary embodiment of FIGS. 1 to 4 and any repetitive explanation concerning the above elements will be omitted.

Referring to FIGS. 5 to 7, the display apparatus includes a display panel 100, a driver, a controller and a first flexible substrate 502.

The display panel 100 includes an active area AA displaying an image and a peripheral area PA which is disposed adjacent to the active area AA and not displaying an image. The active area AA may be a display area.

The display panel 100 includes a plurality of gate lines lengthwise extending in a first direction D1 and a plurality of data lines lengthwise extending in a second direction D2 crossing the first direction D1. The display panel 100 includes a plurality of pixels respectively electrically connected to the gate lines GL and the data lines DL. The gate lines GL, the data lines DL and the pixels are disposed in the active area AA.

The display panel 100 includes a first substrate 110, and a second substrate 150 which faces the first substrate 110.

In an exemplary embodiment, for example, the first substrate 110 may be an array substrate. The gate lines GL and the data lines DL may be disposed within the first substrate 110. In addition, the switching elements TR respectively connected to the gate lines GL and the data lines DL may be disposed within the first substrate 110. In addition, a pixel electrode may be disposed within the first substrate 110.

The second substrate 150 may be disposed opposite to the first substrate 110. A common electrode facing the pixel electrode PE may be disposed within the second substrate 150. In addition, a color filter defining a color of the pixel may be disposed within the second substrate 150.

The driver collectively includes a gate driver 300 and a data driver 400. The driver may provide a driving signal to the display panel 100. The controller collectively includes first and second printed circuit boards 200 and 210 which are spaced apart from each other. The controller may provide a control signal to the driver.

In an exemplary embodiment, a timing controller (not shown) and a power voltage generator (not shown) may be disposed on the first and/or second printed circuit boards 200 and 210.

In an exemplary embodiment, the gate driver 300 may include a plurality of gate driving chips (not shown) integrated on the peripheral area PA of the display panel 100.

The data driver 400 may include a plurality of second flexible substrates 410 respectively electrically connecting the first and second printed circuit boards 200 and 210 to the display panel 100, and a plurality of data driving chips 420.

The first flexible substrate 502 may electrically connect the first printed circuit board 200 to the second printed circuit board 210. The first flexible substrate 502 includes a first contact portion 512, a second contact portion 522 and an overlap portion 536. The first contact portion 512 overlaps a portion of the first printed circuit board 200. The first contact portion 512 electrically connects the first flexible substrate 502 to the first printed circuit board 200. The second contact portion 522 overlaps a portion of the second printed circuit board 210. The second contact portion 522 electrically connects the first flexible substrate 502 to the second printed circuit board 210. The overlap portion 536 overlaps a portion of the display panel 100. The overlap portion 536 attaches the first flexible substrate 502 to the display panel 100. The overlap portion 536 common to both the first and second contact portions 512 and 522 via connecting portions supports the first flexible substrate 502.

In an exemplary embodiment, the first flexible substrate 502 may further include a first connecting portion 510, a second connecting portion 520 and a third connecting portion 534. The first connecting portion 510 connects the first contact portion 512 and the overlap portion 536. The first connecting portion 510 defines a length thereof which extends in the second direction D2. The second connecting portion 520 connects the second contact portion 522 and the overlap portion 536. The second connecting portion 520 defines a length thereof which extends in the second direction D2. The third connecting portion 534 connects the first connecting portion 510 and the second connecting portion 520 to each other. The third connecting portion 534 defines a length thereof which extends in the first direction D1.

In an exemplary embodiment, the overlap portion 536 of the first flexible substrate 502 may overlap the second substrate 150 and may be attached to the second substrate 150.

In an exemplary embodiment, the first flexible substrate 502 and the second flexible substrates 410 may include substantially the same material. In an exemplary embodiment of a method of manufacturing a display apparatus, the first flexible substrate 502 and the second flexible substrates 410 may be respectively attached to the display panel 100 and the first and second printed circuit boards 200 and 210 in a same operation or process.

In one or more exemplary embodiment of the invention, since the first flexible substrate 500 and the second flexible substrates 410 may be respectively attached to the display panel 100 and the first and second printed circuit boards 200 and 210 in a same operation or process, the method of manufacturing the display apparatus may be simplified and the manufacturing cost of the display apparatus may be reduced.

In addition, the overlap portion 536 of the first flexible substrate 502 may be defined by an entire length (in the first direction D1) of the first flexible substrate 502, and such length may be larger than a width of the flexible substrate 502 (in the second direction D2). The overlap portion 536 of the first flexible substrate 502, as a relatively large dimension of the first flexible substrate 502, is attached to the second substrate 150 so that the first flexible substrate 502 may be supported relative to the display panel 100 by the overlap portion 536. Thus, by common connection to the first flexible substrate 502, reliability of the connection between the first and second printed circuit boards 200 and 210 may be improved.

Figure 8:
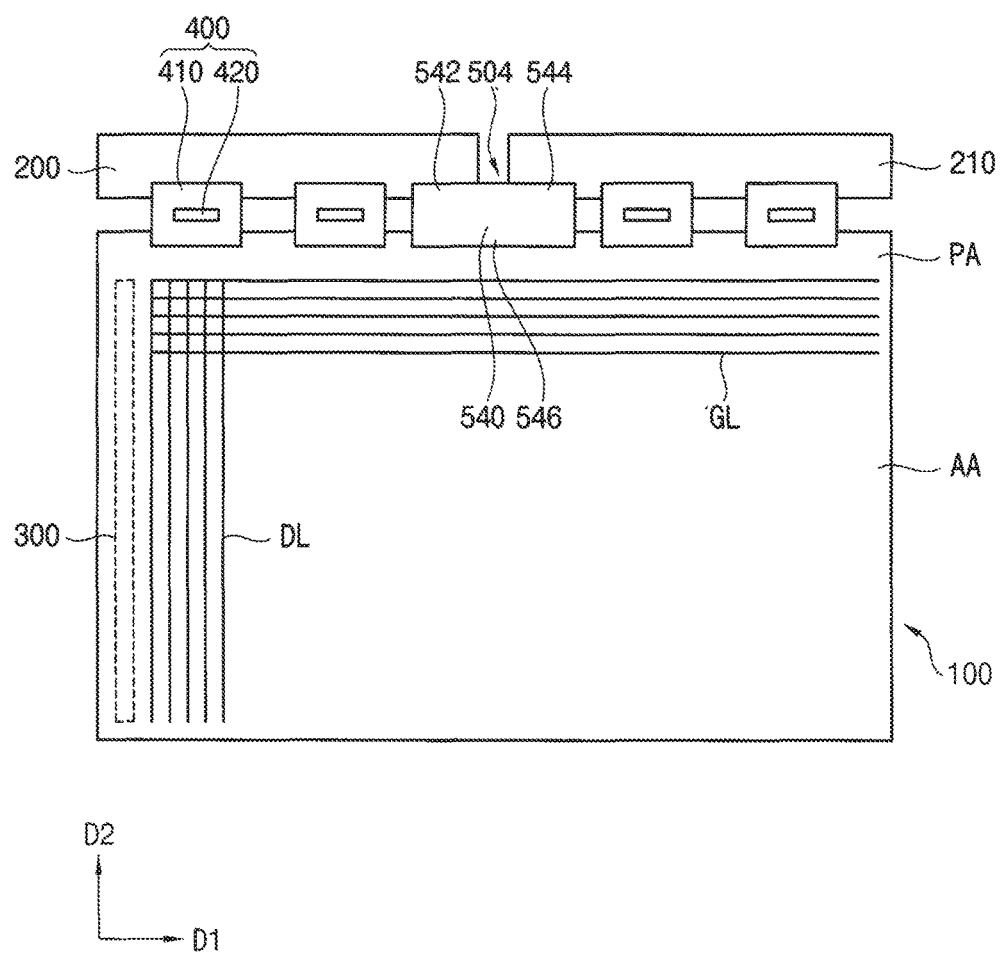
FIG. 8 is a top plan view illustrating still another exemplary embodiment of a display apparatus according to the invention.

FIG. 8 is a top plan view illustrating still another exemplary embodiment of a display apparatus according to the invention. The display apparatus of FIG. 8 is substantially the same as the display apparatus of the previous exemplary embodiment explained referring to FIGS. 1 to 4 except for the shape of the first flexible substrate. Thus, the same reference numerals will be used to refer to the same or like parts as those described in the previous exemplary embodiment of FIGS. 1 to 4 and any repetitive explanation concerning the above elements will be omitted.

Referring to FIG. 8, the display apparatus includes a display panel 100, a driver, a controller and a first flexible substrate 504.

The display panel 100 includes an active area AA displaying an image and a peripheral area PA which is disposed adjacent to the active area AA and not displaying an image. The active area AA may be a display area.

The display panel 100 includes a plurality of gate lines lengthwise extending in a first direction D1 and a plurality of data lines lengthwise extending in a second direction D2 crossing the first direction D1. The display panel 100 includes a plurality of pixels respectively electrically connected to the gate lines GL and the data lines DL. The gate lines GL, the data lines DL and the pixels are disposed in the active area AA.

The display panel 100 includes a first substrate 110, and a second substrate 150 which faces the first substrate 110.

The driver collectively includes a gate driver 300 and a data driver 400. The driver may provide a driving signal to the display panel 100. The controller collectively includes first and/or second printed circuit boards 200 and 210 which are spaced apart from each other to define a gap therebetween. The controller may provide a control signal to the driver.

In an exemplary embodiment, a timing controller (not shown) and a power voltage generator (not shown) may be disposed on the first and second printed circuit boards 200 and 210.

In an exemplary embodiment, the gate driver 300 may include a plurality of gate driving chips (not shown) integrated on the peripheral area PA of the display panel 100.

The data driver 400 may include a plurality of second flexible substrates 410 respectively electrically connecting the first and second printed circuit boards 200 and 210 to the display panel 100, and a plurality of data driving chips 420.

The first flexible substrate 504 may electrically connect the first printed circuit board 200 to the second printed circuit board 210. The first flexible substrate 504 includes a first contact portion 542, a second contact portion 544 and an overlap portion 546. A connecting portion 540 may be commonly disposed to the first and second contact portions 542 and 544, and the overlap portion 546, to connect the first and second contact portions 542 and 544 to the overlap portion 546. The connecting portion 540 may be defined by an area of the first flexible substrate 504 which does not overlap any of the display panel 100, the first printed circuit board 200 or the second printed circuit board 210. The first contact portion 542 overlaps a portion of the first printed circuit board 200. The first contact portion 542 electrically connects the first flexible substrate 504 to the first printed circuit board 200. The second contact portion 544 overlaps a portion of the second printed circuit board 210. The second contact portion 544 electrically connects the first flexible substrate 504 to the second printed circuit board 210. The overlap portion 546 overlaps a portion of the display panel 100. The overlap portion 546 attaches the first flexible substrate 504 to the display panel 100. The overlap portion 546 common to both the first and second contact portions 512 and 522 supports the first flexible substrate 504.

In an exemplary embodiment, the overlap portion 546 of the first flexible substrate 504 may overlap the first substrate 110 and may be attached to the first substrate 110. The overlap portion 546 of the first flexible substrate 504 may overlap only the first substrate 110 and may not overlap the second substrate 150, but the invention is not limited thereto. In addition, the first flexible substrate 504 may have an overall rectangular shape in the top plan view. A width of the first flexible substrate 504 in the second direction D2 may be uniform across an entirety of the length of the first flexible substrate 504 in the first direction D1.

In an exemplary embodiment, the first flexible substrate 504 and the second flexible substrates 410 may include substantially the same material. In an exemplary embodiment of a method of manufacturing a display apparatus, the first flexible substrate 504 and the second flexible substrates 410 may be attached to the display panel 100 and the first and second printed circuit boards 200 and 210 in a same operation or process.

In one or more exemplary embodiment of the invention, since the first flexible substrate 505 and the second flexible substrates 410 may be respectively attached to the display panel 100 and the first and second printed circuit boards 200 and 210 in a same operation or process, the method of manufacturing the display apparatus may be simplified and the manufacturing cost of the display apparatus may be reduced.

In addition, overlap portion 546 of the first flexible substrate 504 may be defined by an entire length (in the first direction D1) of the first flexible substrate 504, and such length may be larger than a width of the flexible substrate 504 (in the second direction D2). The overlap portion 546 of the first flexible substrate 504, as a relatively large dimension of the first flexible substrate 504, is attached to the first substrate 110 so that the first flexible substrate 504 may be supported by the overlap portion 546. Thus, by common connection to the first flexible substrate 504, reliability of the connection between the first and second printed circuit boards 200 and 210 may be improved.

Figure 9:
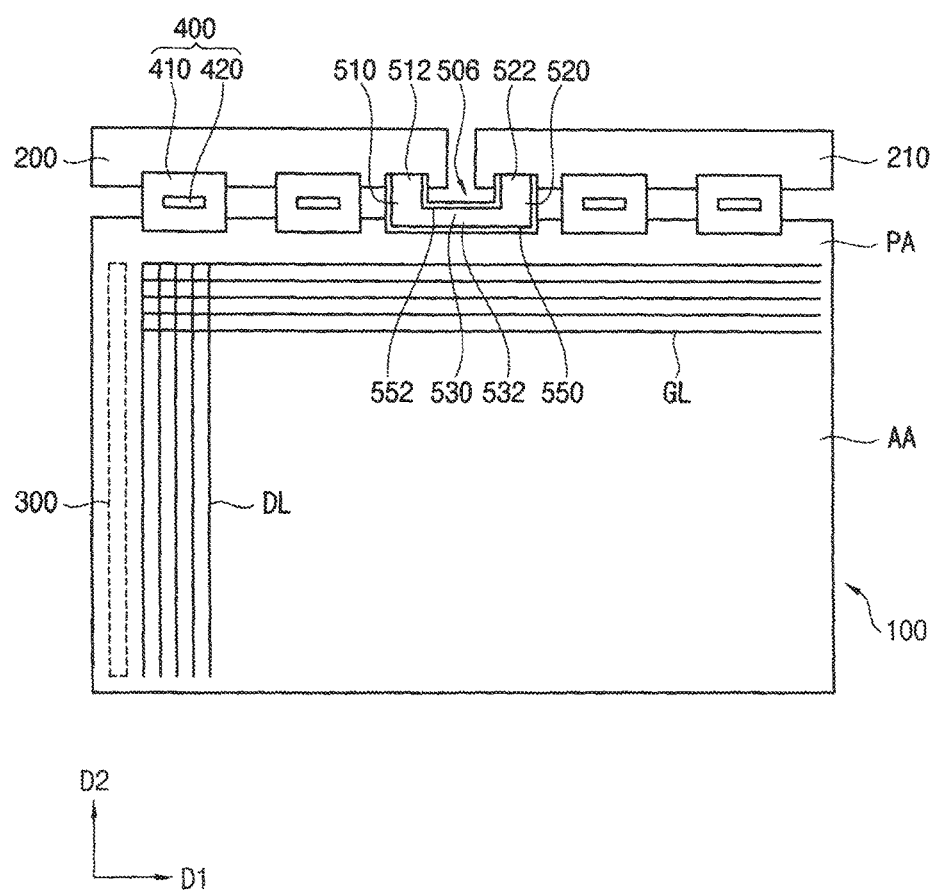
FIG. 9 is a top plan view illustrating yet another exemplary embodiment of a display apparatus according to the invention.

FIG. 9 is a top plan view illustrating yet another exemplary embodiment of a display apparatus according to the invention. The display apparatus according to FIG. 9 is substantially the same as the display apparatus of the previous exemplary embodiment explained referring to FIGS. 1 to 4 except that the first flexible substrate further includes a dummy line. Thus, the same reference numerals will be used to refer to the same or like parts as those described in the previous exemplary embodiment of FIGS. 1 to 4 and any repetitive explanation concerning the above elements will be omitted.

Referring to FIG. 9, the display apparatus includes a display panel 100, a driver, a controller and a first flexible substrate 506.

The display panel 100 includes an active area AA displaying an image and a peripheral area PA which is disposed adjacent to the active area AA and not displaying an image. The active area AA may be a display area.

The display panel 100 includes a plurality of gate lines lengthwise extending in a first direction D1 and a plurality of data lines lengthwise extending in a second direction D2 crossing the first direction D1. The display panel 100 includes a plurality of pixels respectively electrically connected to the gate lines GL and the data lines DL. The gate lines GL, the data lines DL and the pixels are disposed in the active area AA.

The display panel 100 includes a first substrate 110, and a second substrate 150 which faces the first substrate 110.

The driver collectively includes a gate driver 300 and a data driver 400. The driver may provide a driving signal to the display panel 100. The controller collectively includes first and second printed circuit boards 200 and 210 which are spaced apart from each other. The controller may provide a control signal to the driver.

In an exemplary embodiment, a timing controller (not shown) and a power voltage generator (not shown) may be disposed on the first and/or second printed circuit boards 200 and 210.

In an exemplary embodiment, the gate driver 300 may include a plurality of gate driving chips (not shown) integrated on the peripheral area PA of the display panel 100.

The data driver 400 may include a plurality of second flexible substrates 410 respectively electrically connecting the first and second printed circuit boards 200 and 210 to the display panel 100 and a plurality of data driving chips 420.

The first flexible substrate 506 may electrically connect the first printed circuit board 200 to the second printed circuit board 210. The first flexible substrate 506 includes a first contact portion 512, a second contact portion 522 and an overlap portion 532. The first contact portion 512 overlaps a portion of the first printed circuit board 200. The first contact portion 512 electrically connects the first flexible substrate 506 to the first printed circuit board 200. The second contact portion 522 overlaps a portion of the second printed circuit board 210. The second contact portion 522 electrically connects the first flexible substrate 506 to the second printed circuit board 210. The overlap portion 532 overlaps a portion of the display panel 100. The overlap portion 532 attaches the first flexible substrate 506 to the display panel 100. The overlap portion 532 common to both the first and second contact portions 512 and 522 via connecting portions supports the first flexible substrate 506.

In an exemplary embodiment, the first flexible substrate 506 may further include the first connecting portion 510, the second connecting portion 520 and the third connecting portion 530. The first connecting portion 510 connects the first contact portion 512 and the overlap portion 532 to each other. The first connecting portion 510 lengthwise extends in the second direction D2. The second connecting portion 520 connects the second contact portion 522 and the overlap portion 532 to each other. The second connecting portion 520 lengthwise extends in the second direction D2. The third connecting portion 530 connects the first connecting portion 510 and the second connecting portion 520 to each other. The third connecting portion 530 lengthwise extends in the first direction D1.

In addition, in an exemplary embodiment, the first flexible substrate 506 may further include a plurality of dummy lines 550 and 552 disposed on the first to third connecting portions 510, 520 and 530. The dummy lines 550 and 552 may improve rigidity of the first flexible substrate 506.

Within the first flexible substrate 506, the dummy lines 550 and 552 may be disposed on a base substrate (not shown) of the first flexible substrate 506.

In an exemplary embodiment, for example, the dummy lines 550 and 552 may not be electrically connected to other elements of the display apparatus. The dummy lines 550 and 552 may be electrically floated. The dummy lines 550 and 552 may include a metal material which has rigidity. The dummy lines 550 and 552 may have a U-shape in the top plan view, but the invention is not limited thereto.

In an exemplary embodiment, the first flexible substrate 506 and the second flexible substrates 410 may include substantially the same material. In an exemplary embodiment of a method of manufacturing a display apparatus, the first flexible substrate 506 and the second flexible substrates 410 may be attached to the display panel 100 and the first and second printed circuit boards 200 and 210 in a same operation or process.

In one or more exemplary embodiment of the invention, since the first flexible substrate 506 and the second flexible substrates 410 may be respectively attached to the display panel 100 and the first and second printed circuit boards 200 and 210 in a same operation or process, the method of manufacturing the display apparatus may be simplified and the manufacturing cost of the display apparatus may be reduced.

In addition, the overlap portion 532 of the first flexible substrate 506 may be defined by an entire length (in the first direction D1) of the first flexible substrate 506, and such length may be larger than a width of the flexible substrate 506 (in the second direction D2). The first flexible substrate 506 further includes the dummy lines 550 and 552 so that the rigidity of the first flexible substrate 506 may be improved and the reliability of the connection between the first and second printed circuit boards 200 and 210 may be improved.

Figure 10:
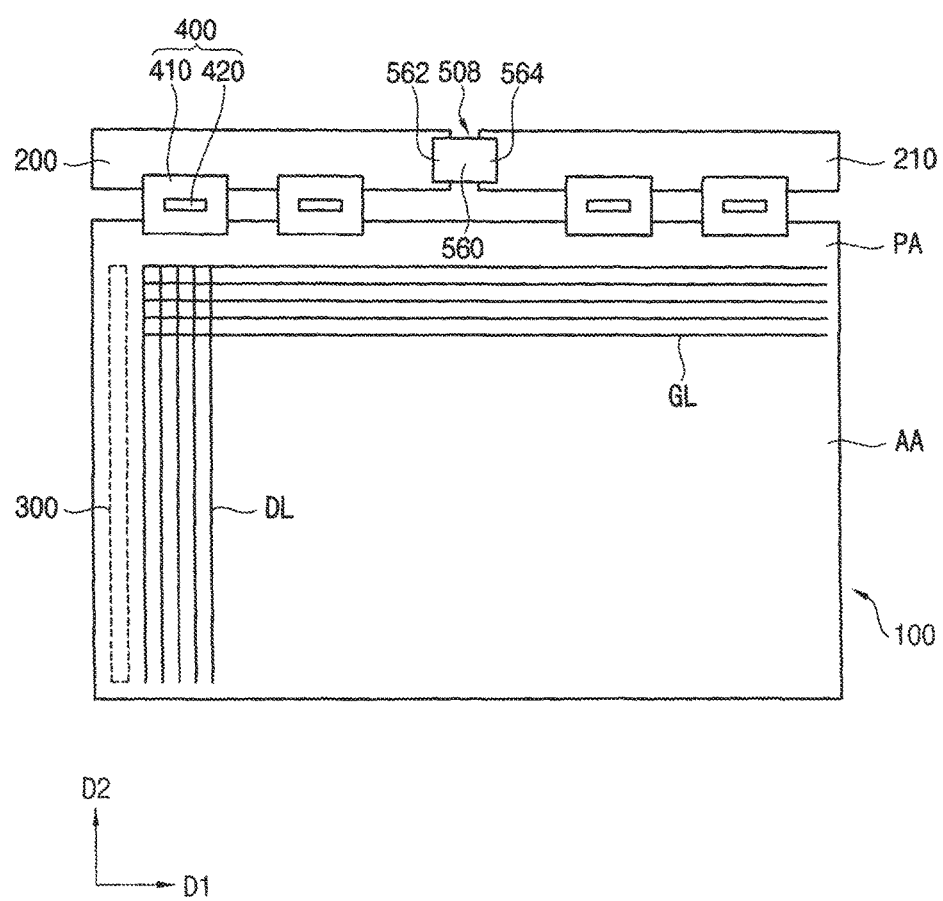
FIG. 10 is a top plan view illustrating yet another exemplary embodiment of a display apparatus according to the invention.

FIG. 10 is a top plan view illustrating yet another exemplary embodiment of a display apparatus according to the invention. The display apparatus according to FIG. 10 is substantially the same as the display apparatus of the previous exemplary embodiment explained referring to FIG. 8 except that the overlap portion of the first flexible substrate is omitted. Thus, the same reference numerals will be used to refer to the same or like parts as those described in the previous exemplary embodiment of FIG. 8 and any repetitive explanation concerning the above elements will be omitted.

Referring to FIG. 10, the display apparatus includes a display panel 100, a driver, a controller and a first flexible substrate 508.

The display panel 100 includes an active area AA displaying an image and a peripheral area PA which is disposed adjacent to the active area AA and not displaying an image. The active area AA may be a display area.

The display panel 100 includes a plurality of gate lines lengthwise extending in a first direction D1 and a plurality of data lines lengthwise extending in a second direction D2 crossing the first direction D1. The display panel 100 includes a plurality of pixels respectively electrically connected to the gate lines GL and the data lines DL. The gate lines GL, the data lines DL and the pixels are disposed in the active area AA.

The display panel 100 includes a first substrate 110, and a second substrate 150 which faces the first substrate 110.

The driver collectively includes a gate driver 300 and a data driver 400. The driver may provide a driving signal to the display panel 100. The controller collectively includes first and second printed circuit boards 200 and 210 which are spaced apart from each other. The controller may provide a control signal to the driver.

In an exemplary embodiment, a timing controller (not shown) and a power voltage generator (not shown) may be disposed on the first and/or second printed circuit boards 200 and 210.

In an exemplary embodiment, the gate driver 300 may include a plurality of gate driving chips (not shown) integrated on the peripheral area PA of the display panel 100.

The data driver 400 may include a plurality of second flexible substrates 410 respectively electrically connecting the first and second printed circuit boards 200 and 210 to the display panel 100 and a plurality of data driving chips 420.

The first flexible substrate 508 may electrically connect the first printed circuit board 200 to the second printed circuit board 210. The first flexible substrate 508 includes a first contact portion 562 and a second contact portion 564. The first contact portion 562 overlaps a portion of the first printed circuit board 200. The first contact portion 562 electrically connects the first flexible substrate 508 to the first printed circuit board 200. The second contact portion 564 overlaps a portion of the second printed circuit board 210. The second contact portion 564 electrically connects the first flexible substrate 508 to the second printed circuit board 210.

The first flexible substrate 508 may further include a connecting portion 560 connecting the first contact portion 562 and the second contact portion 564. The first flexible substrate 508 may have a rectangular shape. A width of the first flexible substrate 508 in the second direction D2 may be uniform across an entirety of the length of the first flexible substrate 508 in the first direction D1. The connecting portion 560 may be defined by an area of the first flexible substrate 508 which does not overlap any of the display panel 100, the first printed circuit board 200 or the second printed circuit board 210.

In an exemplary embodiment, the first flexible substrate 508 and the second flexible substrates 410 may include substantially the same material. In an exemplary embodiment of a method of manufacturing a display apparatus, the first flexible substrate 508 and the second flexible substrates 410 may be attached to the display panel 100 and the first and second printed circuit substrates 200 and 210 in a same operation or process.

In one or more exemplary embodiment of the invention, since the first flexible substrate 508 and the second flexible substrates 410 may be respectively attached to the display panel 100 and the first and second printed circuit substrates 200 and 210 in a same operation or process, the method of manufacturing the display apparatus may be simplified and the manufacturing cost of the display apparatus may be reduced.

In addition, the overlap portion in FIG. 8 is omitted and the first flexible substrate 508 is attached only to the first and second printed circuit boards 200 and 210 so that the structure of the first flexible substrate 508 may be simplified.

Figure 11:
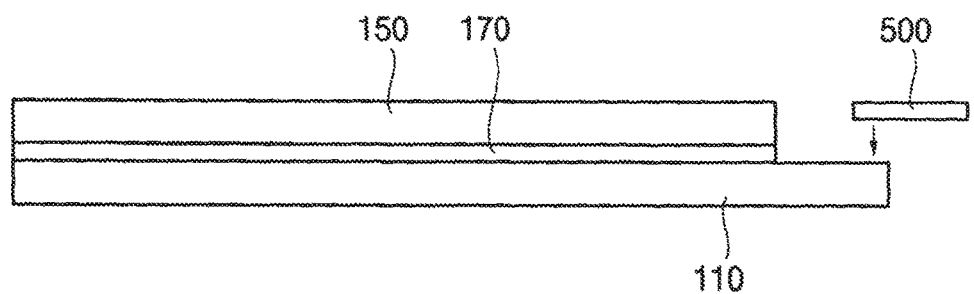
FIGS. 11 to 14 are cross-sectional views and top plan views illustrating an exemplary embodiment of a method of manufacturing a display apparatus according to the invention.
Figure 12:
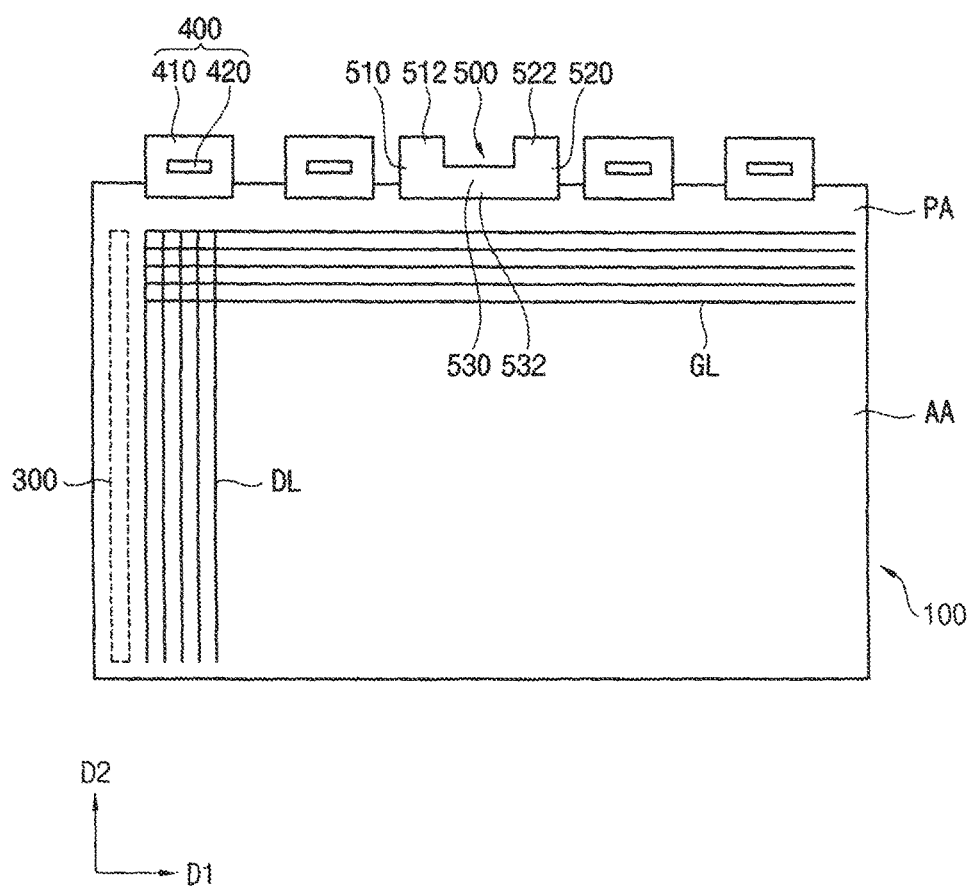
Figure 13:
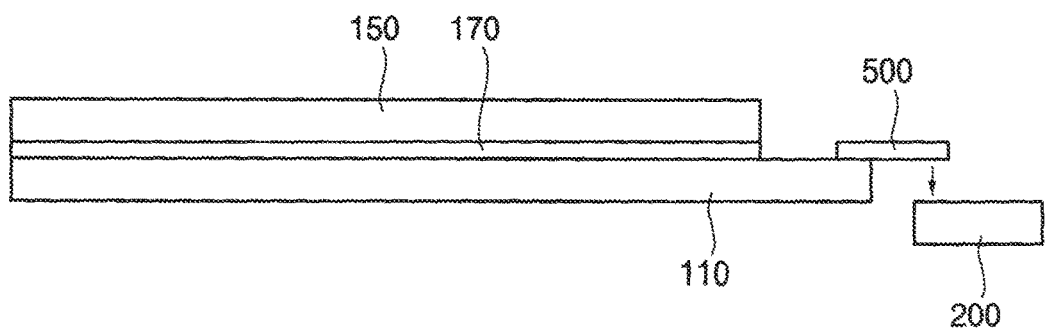
Figure 14:
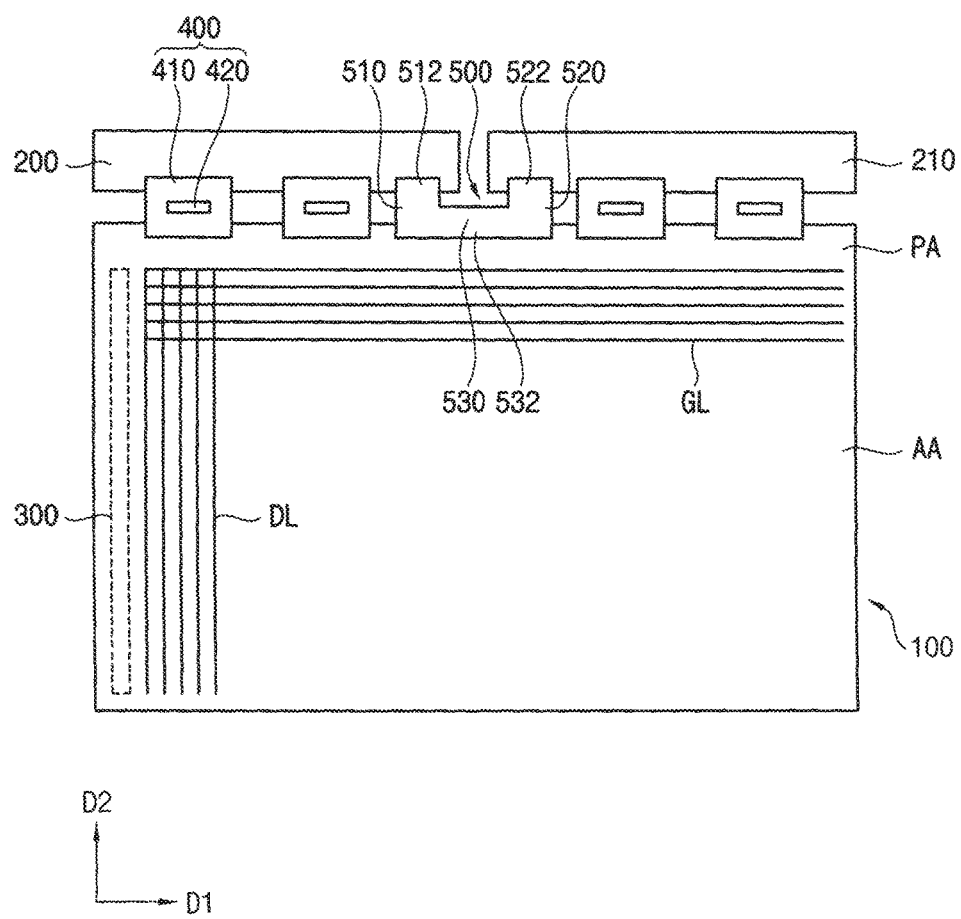

FIGS. 11 to 14 are cross-sectional views and top plan views illustrating an exemplary embodiment of a method of manufacturing a display apparatus according to the invention. FIGS. 11 and 13 are cross-sectional views illustrating the method of manufacturing the display apparatus. FIGS. 12 and 14 are top plan views illustrating the method of manufacturing the display apparatus. While the first flexible substrate 500 of FIGS. 1 to 4 is illustrated in FIGS. 11-14 for convenience of explanation, any one of the previously described exemplary embodiments of the first flexible substrates 502 to 506 may be used in the exemplary embodiment of the method of manufacturing a display apparatus according to the invention.

Referring to FIGS. 1, 2, 11 and 12, a display panel 100 including a first substrate 110 including a switching element TR and a pixel electrode which is electrically connected to the switching element, and a second substrate 150 facing the first substrate 110 are provided. A first flexible substrate 500 is also prepared.

The first flexible substrate 500 and the display panel 100 are attached to each other such as by thermo-compression bonding such that an overlap portion 532 of the first flexible substrate 500 overlaps an edge portion of the display panel 100. The first flexible substrate 500 may be attached to the display panel 100 as indicated by the arrow in FIG. 11, but the invention is not limited thereto. A second flexible substrate 410 is provided in plural and attached to the edge portion of the display panel 100 such as by thermo-compression bonding.

The second flexible substrates 410 and the first flexible substrate 500 may be sequentially attached to the display panel 100 such as by thermo-compression bonding in a same process of the method of manufacturing the display apparatus according to the invention, but the invention is not limited thereto. Alternatively, the second flexible substrates 410 and the first flexible substrate 500 may be simultaneously attached to the display panel 100 such as by thermo-compression bonding, in a same process of the method of manufacturing the display apparatus according to the invention.

The display panel 100 includes or defines an active area AA displaying an image and a peripheral area PA which is disposed adjacent to the active area AA and not displaying an image. The first flexible substrate 500 may be attached to the peripheral area PA of the display panel 100. In an exemplary embodiment, for example, the first flexible substrate 500 may be attached to the first substrate 110 in the peripheral area PA of the display panel 100.

Alternatively, the first flexible substrate 500 may be attached to the second substrate 150 in the peripheral area PA of the display panel 100.

Referring to FIGS. 13 and 14, first and second printed circuit boards 200 and 210 are provided. With the first flexible substrate 500 and the second flexible substrates 410 attached to the peripheral area PA of the display panel 100, the first flexible substrate 500 and the first and second printed circuit boards 200 and 210 are connected to each other such as by thermo-compression bonding, such that the first contact portion 512 of the first flexible substrate 500 overlaps the first printed circuit board 200 and the second contact portion 522 of the first flexible substrate 500 overlaps the second printed circuit board 210. The first flexible substrate 500 may be attached to the first and second printed circuit boards 200 and 210 as indicated by the arrow in FIG. 13, but the invention is not limited thereto.

In addition, with the first flexible substrate 500 and the second flexible substrates 410 attached to the peripheral area PA of the display panel 100, the second flexible substrates 410 are respectively connected to the first and second printed circuit boards 200 and 210 such as by thermo-compression bonding.

The second flexible substrates 410 and the first flexible substrate 500 may be sequentially attached to the first and second printed circuit boards 200 and 210 such as by thermo-compression bonding in a same process of the method of manufacturing the display apparatus according to the invention, but the invention is not limited thereto. Alternatively, the second flexible substrates 410 and the first flexible substrate 500 may be simultaneously attached to the first and second printed circuit boards 200 and 210 such as by thermo-compression bonding in a same process of the method of manufacturing the display apparatus according to the invention.

According to one or more of the exemplary embodiments according to the invention, the first flexible substrate 500 may be attached to the first and second printed circuit boards 200 and 210 in a same operation or process in which the second flexible substrates 410 are respectively attached to the first and second printed circuit boards 200 and 210.

Thus, an additional process of connecting the FFC or the FPC to connect the first and second printed circuit boards to each other of the conventional method of manufacturing a display apparatus is obviated so that the operations or processes of manufacturing the display apparatus may be simplified.

In addition, for the first flexible substrate 500 which connects the first and second printed circuit boards 200 and 210 to each other, the overlap portion 532 of the first flexible substrate 500 is additionally attached to the display panel (such as at the first substrate 110) so that the first flexible substrate 500 is supported. In other exemplary embodiments, for the first flexible substrate 500 which connects the first and second printed circuit boards 200 and 210 to each other, dummy lines may be disposed in the first flexible substrate to as to increase rigidity of the first flexible substrate. Accordingly, in one or more exemplary embodiment according to the invention, the reliability of the connection between the first and second printed circuit boards 200 and 210 may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:
    a display panel which displays an image, the display panel comprising
        a first substrate in which a switching element and a pixel electrode which is electrically connected to the switching element are disposed, and
        a second substrate facing the first substrate;
    a driver connected to the display panel and configured to provide a driving signal to the display panel to drive the display panel;
    a controller connected to the driver and configured to provide a control signal to the driver to control the driver, the controller comprising a first printed circuit board and a second printed circuit board which are spaced apart from each other; and a single first flexible substrate electrically connecting the first printed circuit board to the second printed circuit board spaced apart from the first printed circuit board, wherein the single first flexible substrate contacts the first printed circuit board, the second printed circuit board and the display panel.

2. The display apparatus of claim 1, wherein in a top plan view, the single first flexible substrate defines:

a first contact portion thereof at which the single first flexible substrate is electrically connected to the first printed circuit board;

a second contact portion thereof at which the single first flexible substrate is electrically connected to the second printed circuit board; and a third contact portion thereof at which the single first flexible substrate is electrically connected to the display panel.

3. The display apparatus of claim 2, wherein the first and second printed circuit boards are spaced apart from each other in a first direction, and the single first flexible substrate further defines:

a first connecting portion thereof extending in a second direction crossing the first direction to connect the first contact portion and the third contact portion to each other;

a second connecting portion thereof extending in the second direction to connect the second contact portion and the third contact portion to each other; and a third connecting portion extending in the first direction to connect the first connecting portion and the second connecting portion to each other.

4. The display apparatus of claim 3, wherein the single first flexible substrate comprises a dummy line which is disposed on the first to third connecting portions of the single first flexible substrate.

5. The display apparatus of claim 1, wherein the single first flexible substrate includes polyimide.

6. The display apparatus of claim 2, wherein the display panel comprises an active area which displays the image and a peripheral area which is disposed adjacent to the active area and which does not display the image, and the third contact portion of the single first flexible substrate overlaps the peripheral area of the display panel and the single first flexible substrate is attached to the peripheral area of the display panel at the third contact portion.

7. The display apparatus of claim 2, wherein the third contact portion of the single first flexible substrate overlaps the first substrate of the display panel and the single first flexible substrate is attached to the first substrate of the display panel at the third contact portion.

8. The display apparatus of claim 2, wherein the third contact portion of the single first flexible substrate overlaps the second substrate of the display panel and the single first flexible substrate is attached to the second substrate of the display panel at the third contact portion.

9. The display apparatus of claim 1, wherein the driver comprises a data driver, and the data driver comprises a second flexible substrate provided in plurality respectively electrically connecting the first and second printed circuit boards to the display panel.

10. The display apparatus of claim 9, wherein the data driver further comprises a data driving chip provided in plurality respectively mounted on the second flexible substrates by a chip on film method.

11. The display apparatus of claim 9, wherein the data driver further comprises a data driving chip provided in plurality respectively mounted on the first substrate by a chip on glass method.

12. The display apparatus of claim 1, wherein the driver comprises a gate driver, and the gate driver comprises a gate driving chip provided in plurality directly mounted on the first substrate.

13. The display apparatus of claim 1, wherein in a top plan view, the single first flexible substrate has a rectangular shape.

14. The display apparatus of claim 1, wherein in a top plan view, the single first flexible substrate has a U-shape.

* * * * *